United States Patent [19]
Grulich et al.

[11] 3,915,655
[45] Oct. 28, 1975

[54] PROCESS AND APPARATUS FOR BURNING GAS AND VAPOR MIXTURE PRODUCED IN THE PURIFICATION OF COKE GAS OVENS

[75] Inventors: Heinz Grulich, Gladbeck; Erich Hackler, Kettwig; Manfred Galow, Gladbeck, all of Germany

[73] Assignee: Didier-Kellogg Industrieanlagenbau GmbH, Essen, Germany

[22] Filed: Aug. 27, 1973

[21] Appl. No.: 391,755

[30] Foreign Application Priority Data
Aug. 25, 1972  Germany............................ 2241891

[52] U.S. Cl.................. 23/262; 23/277 C; 423/237
[51] Int. Cl.².......................................... C10B 39/00
[58] Field of Search........... 423/237, 224; 23/277 R, 23/274 C, 262, 265

[56] References Cited
UNITED STATES PATENTS

| | | | |
|---|---|---|---|
| 1,348,227 | 8/1920 | La Cour............... | 23/262 X |
| 2,578,193 | 12/1951 | Marshall, Jr. ...... | 23/262 X |
| 2,685,343 | 8/1954 | Permann.............. | 423/237 X |
| 2,879,862 | 3/1959 | Burden, Jr. ........ | 23/277 C |
| 3,661,507 | 5/1972 | Breitbach............ | 423/237 X |
| 3,804,596 | 4/1974 | Fischer............... | 423/237 X |
| 3,850,581 | 11/1974 | Hills et al........... | 23/277 C |

*Primary Examiner*—John H. Mack
*Assistant Examiner*—A. C. Prescott
*Attorney, Agent, or Firm*—Wenderoth, Lind & Ponack

[57] ABSTRACT

An apparatus for removing and burning ammonia vapors and the like which are stripped from a waste liquor such as ammonia water which may be produced during the purification of distillation gases obtained from coke gases is disclosed and comprises a stripper column means for stripping ammonia vapors from a waste liquor having an inlet for communicating with a waste liquor supply and having an outlet in the top portion for stripped ammonia vapors; and a burner member having a plurality of feed ducts each of the feed duct members separated from the other feed duct members and being arranged to form a cone of flame having a hollow interior region; a furnace means having the burner member located therein at the upper portion thereof and having an exit for exhaust gases; feed means for supplying the stripped ammonia from the stripper column to the burner member; and a closed system heat transfer means operatively connected between the furnace means and the stripper column for transferring heat for use in the stripper column means.

7 Claims, 1 Drawing Figure

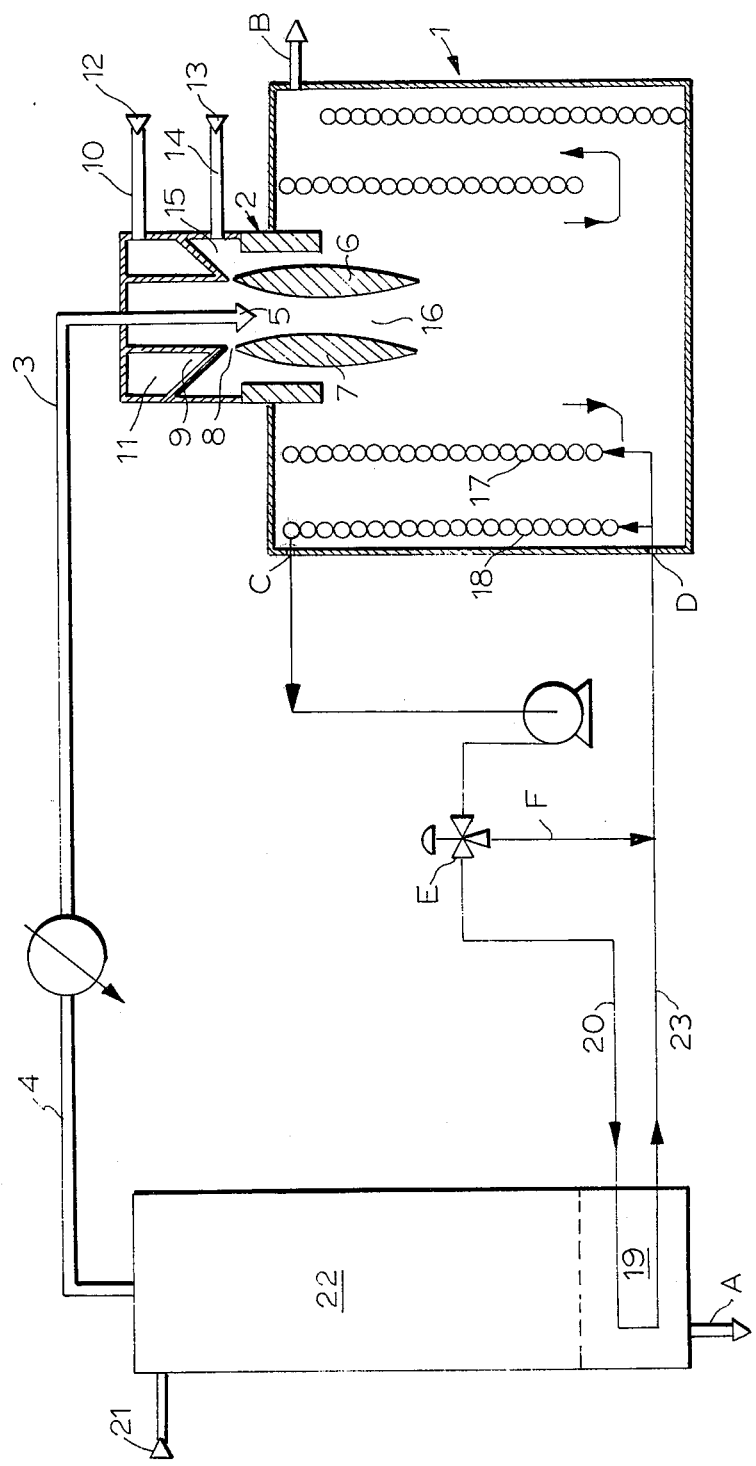

PROCESS AND APPARATUS FOR BURNING GAS AND VAPOR MIXTURE PRODUCED IN THE PURIFICATION OF COKE GAS OVENS

BACKGROUND

1. Field of the Invention

The invention relates to a process and apparatus for burning the gas mixtures which are obtained during the purification of coke-oven gases. In particular the invention is directed toward treating ammonia vapors which are converted into nitrogen and water in a reducing atmosphere of a combustion furnace.

2. Description of the Prior Art

Since the inception of the atmospheric nitrogen industry, water containing ammonia which is produced during the purification of coke-oven gases has not been utilized to full advantage.

While it is known that free ammonia may be removed from the ammoniacal liquid by means of a so-called "stripper column," large amounts of ammonia vapors are generated in this process, and such vapors may not be released into the open air since they present an obvious air pollution hazard. Considerable efforts have been applied to the task of eliminating the ammonia with the greatest possible economy of costs. The continuously increasing legislative requirements concerning the environment and, in particular, air pollution must be taken into account in this connection.

Accordingly, there have been prior art attempts to burn the ammonia in such a manner as to release the smallest possible amount of undesirable nitric oxides into the atmosphere. For example U.S. Pat. No. 3,000,693 discloses the concept of burning the exhausted ammonia vapors in the so-called Dutch oven. However, these ovens must be first preheated in order to maintain the combustion of the ammonia air mixture. Even under these conditions, however, a fuel such as oil or gas must be added when the fraction of water vapor and other, inert gas components in the ammonia vapors is too high. A further limitation is that there are prescribed temperatures and other such conditions which must be strictly adhered to under the greatest variety of conditions if favorable results are to be obtained. These conditions depend basically on the structure and arrangement of the specific combustion oven. This method does not utilize the heat generated by the burning ammonia which is consequently wasted energy.

The industrial utilization of the heat produced during the combustion of ammonia vapors is not unknown however, as shown by the proposal in German printed specification DAS 1,202,772, for burning ammonia obtained during the processing of coke-oven gas and gasworks gas. According to this process, the ammonia vapors are heated in a reactor by means of the combustion of a heating agent, and the hot gas mixture is then passed through a free region of decomposition or through a region filled with heat-resistant packings or a nickel catalyst in order to be burned completely in a third region under the addition of further air. The expenditure which is required for the realization of this proposed process is quite high. A special reactor comprising three separate regions and a plurality of inlets for gas, air and ammonia is required and the gaseous products of combustion must be transferred into a subsequent waste-heat boiler for the purpose of utlizing the heat of combustion.

While the burners structure of the type of the invention are known (German Publication Documents (DT-OS) 1,451,471), the use of the burners in a system such as the subject invention has not been heretofore proposed.

SUMMARY OF THE INVENTION

In order to overcome the disadvantages of the prior art the present invention discloses a system wherein the complete combustion of the ammonia vapors takes place in one reaction stage at a relatively low temperature and the exhaust gas produced from the reaction has a nitric-oxide content of about 150 ppm. This result is achieved by the utilization of a flame cone which possesses a region comprising a particularly strong reducing atmosphere into which the ammonia vapors are introduced. The gaseous combustion products are simultaneously cooled. In this manner the necessity for special catalysts in special reactors (inclusive of combustion furnaces of complex structure and layout) is avoided. Through the fact that the three media, coke gas, ammonia vapor and air for combustion, are fed separately but are combined in a specific manner, it is possible to maintain the optimal conditions of combustion in the flame cone even under different loads of the furnace.

Furthermore, the heat generated during the combustion process is transferred by means of oil circulating in a closed system and in parallel with the gaseous combustion products. The oil is then cooled to recover heat for the purpose of producing stripper steam. The process avoids the heat losses that take place where the gases of combustion are transferred to a wasteheat boiler connected subsequently to the oven of combustion. This is important, since the relatively low temperature of combustion create a potential hazard in that the temperature of the gases of combustion may drop below the dew point of the sulfuric acid, with obvious adverse effects such as corrosion. The subject invention eliminates such corrosion by cooling the gaseous combustion products directly in the combustion oven to a controlled temperature.

BRIEF DESCRIPTION OF THE DRAWING

The FIGURE shows a schematic illustration of an apparatus for the realization of the invention.

DETAILED DESCRIPTION OF THE PREFERRED EMBODIMENT

The present invention generally employs an apparatus having a burner which possesses three ducts that are separated from each other and are suitable to simultaneously feed ammonia vapors, an additional heating medium such as coke gas and air. Each duct feeds a specific one the three mentioned gases and the openings of the ducts are arranged to form a cone of flame which has a hollow apex and is preferably of annuler shape. A strong reducing atmosphere is thus created in the interior of the cone. The separate feeding of the material permits regulation of the flame to any extent desired. Thus, if one assumes that a constant amount of ammonia is to be burned, the variations in the inlet temperature of hot oil can be compensated for by admixing a greater on smaller amount of coke gas and the air can be metered exactly in dependence thereon. These advantages are supplemented by the combination of the ducts in the burner, in which manner it is possible to exert an effect on the shape and arrangement of the flame as well as on its composition. The methods of regulation are well known to those of ordinary skill in the art. Referring now to the drawing, reference numeral 1 denotes a pipe furnace having a burner 2 located therein. Ammonia vapors 4 are supplied to the burner 2 through pipe 3.

The ammonia vapors flow through distributor nozzle 5 into a region 6 of a truncated hollow cone of flame 7. The cone is formed by means of an annular outlet opening 8 of a nozzle 9. A coke gas 12, which is ejected from the nozzle 9 is provided thereto through a pipe 10 and a duct 11. The air 13 which is required for combustion is supplied to the nozzle 9 from outside of the system to flame cone 7, through a pipe 14 and a duct 15 that surrounds at least outlet-opening 8 of nozzle 9.

The flame cone 7 extends downwardly toward the bottom of the oven 1, and one of the means of combustion 4, 12, 13 or a plurality thereof is blown under pressure into the burner 2. Naturally, the gases of combustion also have the same direction initially. The direction of the gases of combustion is reversed substantially in the area of the bottom of the oven, in particular through the flue draft, as shown by the arrows in the drawing. Hot gaseous combustion products 16 are cooled on pipe coils 17 and a hot oil 18 flowing therein is thus heated.

Owing to the described arrangement of flame cone 7, wherein the air required for combustion is supplied from outside, a region of excess oxygen exists in the outer regions of the flame while a deficiency in oxygen is encountered as one moves toward the central axis of the cone of flame. Consequently, ammonia vapors 4 introduced into the oxygen deficient central portion of the cone flame burn at a relatively low temperature in a reducing atmosphere, and the amounts of nitric oxide produced during the combustion are kept at a low level.

Stripper column 22 and evaporator 19 are combined in the drawings for the sake of simplicity. Steam produced in the evaporator is introduced into the base of the stripper column and ammonia water (ammoniacal liquid) is introduced at inlet 21 and flows downwardly from the top portion of the stripper column. The free ammonia is stripped from the ammonia water by means of the steam flowing upwardly. The stripped water collected below in the stripper column is fed into the evaporator 19 and is employed for generating the steam which is required for the stripping. Any excess stripped water is removed at A as waste water.

The heat which is generated during the combustion of the ammonia vapors 4 which is supplied from the stripper column is employed for heating a heat exchange medium 18 such as oil. The oil enters the furnace at inlet D, flows upwardly through coil pipes 17 and exits the furnace at outlet C. The temperature of the hot oil at outlet C is kept approximately constant at 300°C. The hot oil is transferred to the evaporator 19 through pipe 20 in order to generate the steam which is employed in the stripping process.

The amount of hot oil introduced into the evaporator is regulated according to the amount of desired steam. The remaining oil in the closed oil circuilating system is caused to bypass the evaporator and is mixed with the oil leaving the evaporator through a pipe 23. The temperature of this mixed oil is equal to the inlet temperature of the oven, which depends on the amount of steam to be generated. The potential danger that the gases of combustion 16 might cool to below the dew point of the sulfuric acid present therein, owing to the low inlet temperature of the hot oil 18, which would promote corrosion in furnace 1, is obviated by the burner of the invention. particularly in connection with the closed-cycle system of the hot oil. A variable amount of coke gas 12 is added as a function of the inlet temperature of the oil and at the substantially constant outlet temperature of the oil, to the substantially constant amount of ammonia vapors to be burned. In this manner the temperature of the gaseous products of combustion 16 at outlet B of the furnace 1 is maintained at above 350°C and, consequently, the temperature in the furnace certainly does not drop below the dew point of the sulfuric acid.

The operation of the device is as follows. Concentrated ammonia solution is introduced into the stripper column 22, at inlet 21 and free ammonia is stripped therefrom by upwardly flowing steam which is produced by evaporator 19.

Some of the stripped water is fed into evaporator 19 and is employed for generating steam and the remaining water is removed at A.

The resulting ammonia vapors 4 are introduced into the hollow region 6 of the flame cone 7 by pipe 3. The temperature of the ammonia vapors may be as low as 85°–90°C. The amount of coke gas 12 and air 13 which are supplied to the flame is automatically varied to warm the hot oils up to 300°C as they leave the furnace at exit C. The hot oils are then transferred to evaporator 19 via pipe 20.

The amount of hot oil required at evaporator 19 depends on the percentage of ammonia contained in the ammonia water and consequently on the quantity of steam which is required to strip the free ammonia. Valve E may be manually set to appropriately proportion the flow of oil between pipe 20 and pipe F. If, for example, the quantity of oil flowing through pipe 20 is increased, the oil mixture in pipe 23 as the oil returns to the furnace 1 at D has a lower temperature than before. Consequently the coke gas and air supplied to the furnace is automatically increased to maintain the temperature at exit C at 300°C. As shown in the drawing the gases generated by the combustion first flow downwardly toward the bottom of the pipe and then flow upwardly through the coils 17 and then through outlet B. The temperature of the outlet gases never falls below 350°C as a result of maintaining the outlet C temperature of the circulating oil at 300°C.

As a result of the relatively low temperature of combustion, the rate of combustion is at a slower, more advantageous rate than is achieved with the prior art devices.

Consequently there is provided process and apparatus of simple construction, which is economical to construct and to operate and which does not contribute to the pollution problem.

We claim:

1. An apparatus for removing and burning ammonia vapors and the like which are stripped from a waste liquor such as ammonia water which may be produced during the purification of distillation gases obtained from coke gases, comprising:
   a stripper column means for stripping ammonia vapors from a waste liquor, said stripper column means having an inlet adapted for communicating with a supply of waste liquor and having an outlet in the top portion thereof for stripped ammonia vapors;

a burner member having a plurality of feed duct members, each of said feed duct member separated from the other of said feed duct members, and being arranged to form a cone of flame having a hollow interior region;

a furnace means having said burner member located within said furnace means at the upper portion thereof, said furnace means having an exit for exhaust gases, feed means connected to said, outlet in said stripper column means and one of said plurality of ducts for supplying the ammonia vapors stripped from the ammonia water in the stripper column means to the burner member; and a closed-system heat transfer means operatively connected between said furnace means and said stripper column means for transfering the heat generated in said furnace means to said stripper column means for use therein.

2. The apparatus of claim 1, wherein said stripper column means comprises an evaporator positioned in the bottom portion thereof, said stripper column inlet being located in the upper portion of said stripper column and further having exit means located at the bottom of said stripper column adapted for removing excess stripped water therefrom.

3. The apparatus of claim 2 wherein the number of feed ducts is three, the one of said feed ducts connected to said stripper column means being centrally located relative to the cone of flame, the others of said three feed ducts being adapted for supplying coke gas and air respectively for forming said hollow conical flame around said one of said feed ducts.

4. The apparatus of claim 3 wherein said closed system heat transfer means comprises a plurality of pipe coils spaced around the periphery of said furnace means, said pipe coils being positioned such that the longitudinal sense of the coils is parallel to the direction of travel of the gases input to the furnace, a first pipe member operatively connected between said pipe coils and said evaporator for transferring a warmed heat exchange medium to said evaporator for causing scrubbing of untreated ammonia water and a second pipe for returning the heat exchange medium from said evaporator to said coils.

5. In an apparatus for removing and burning ammonia vapors and the like which are stripped from a waste liquor such as ammonia water which may be produced during the purification of distillation gases obtained from coke gases, said apparatus comprising:

a stripper column means for stripping ammonia vapors from a waste liquor, said stripper column means having an inlet adapted for communicating with a supply of waste liquor and having an outlet in the top portion thereof for stripped ammonia vapors, said stripper column means being comprised of an evaporator positioned in the bottom portion thereof, said stripper column inlet being located in the upper portion of said stripper column and further having exit means located at the bottom of said stripper column adapted for removing excess stripped water therefrom;

a burner member having three feed duct members, each of said feed duct members separated from the other of said feed duct members, and being arranged to form a cone of flame having a hollow interior region;

a furnace means having said burner member located within said furnace means at the upper portion thereof, said furnace means having an exit for exhaust gases;

feed means connected to said outlet in said stripper column means and one of said plurality of ducts for supplying the ammonia vapors stripped from the ammonia water in the stripper column means to the burner member, the one of said feed ducts connected to said stripper column means being centrally located relative to the cone of flame, the others of said three feed ducts being adapted for supplying coke gas and air, respectively, for forming said hollow conical flame around said one of said feed ducts; and a closed-system heat transfer means operatively connected between said furnace means and said stripper column means for transferring the heat generated in said furnace means to said stripper column means for use therein, said closed system heat transfer means being comprised of a plurality of pipe coils spaced around the periphery of said furnace means, said pipe coils being positioned such that the longitudinal sense of the coils is parallel to the direction of travel of the gases input to the furnace, a first pipe member operatively connected between said pipe coils and said evaporator for transferring a warmed heat exchange medium to said evaporator for causing scrubbing of untreated ammonia water and a second pipe for returning the heat exchange medium from said evaporator to said coils, said heat exchange medium being oil, means to maintain the temperature of said oil as it is transferred from said pipe coil to said first pipe at 300°C. by automatically controlling the supply of air and coke gas to said burner and the temperature of the exhaust gases produced thereby at temperatures greater than 350+C.

6. The apparatus of claim 5 further comprising means whereby a portion of the stripped water can be heated by the evaporator to steam and used to strip free ammonia from ammonia water in the stripper column means and the remaining stripped water removed from said stripper column through said exit means in the bottom of said stripper column member.

7. The apparatus of claim 6 further comprising means whereby said flame cone can be maintained in an annular shape.

* * * * *